United States Patent
Pau et al.

(10) Patent No.: US 7,012,618 B2
(45) Date of Patent: Mar. 14, 2006

(54) METHOD AND DEVICE FOR PROCESSING VIDEO SIGNALS FOR PRESENTATION ON A DISPLAY AND CORRESPONDING COMPUTER PROGRAM PRODUCT

(75) Inventors: Danilo Pau, Sesto San Giovanni (IT); Daniele Alfonso, Monza (IT); Emiliano Piccinelli, Monza (IT); Tiziana Signorelli, San Giovanni La Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/610,341

(22) Filed: Jun. 30, 2003

(65) Prior Publication Data

US 2004/0150655 A1 Aug. 5, 2004

(30) Foreign Application Priority Data

Jul. 1, 2002 (IT) .............................. TO02A0570

(51) Int. Cl.
G09G 5/02 (2006.01)

(52) U.S. Cl. ...................... 345/604; 345/601; 345/605; 345/509

(58) Field of Classification Search ................ 345/604, 345/601, 605, 589
See application file for complete search history.

(56) References Cited

U.S. PATENT DOCUMENTS

| 5,402,513 | A | * | 3/1995 | Schafer | 382/298 |
| 5,416,510 | A | * | 5/1995 | Lipton et al. | 348/43 |
| 5,608,864 | A | * | 3/1997 | Bindlish et al. | 345/558 |
| 5,642,139 | A | | 6/1997 | Eglit et al. | 345/202 |
| 5,790,110 | A | * | 8/1998 | Baker et al. | 345/547 |
| 5,968,167 | A | * | 10/1999 | Whittaker et al. | 712/225 |
| 6,157,396 | A | * | 12/2000 | Margulis et al. | 345/506 |
| 6,231,510 | B1 | * | 5/2001 | Negrin et al. | 600/443 |
| 6,496,608 | B1 | * | 12/2002 | Chui | 382/300 |
| 6,518,974 | B1 | * | 2/2003 | Taylor et al. | 345/582 |
| 6,597,746 | B1 | * | 7/2003 | Amrany et al. | 375/296 |
| 2002/0030652 | A1 | * | 3/2002 | Shibata et al. | 345/87 |

* cited by examiner

*Primary Examiner*—Matthew C. Bella
*Assistant Examiner*—Mike Rahmjoo
(74) *Attorney, Agent, or Firm*—Lisa K. Jorgenson; Robert Iannucci; Seed IP Law Group PLLC

(57) ABSTRACT

An RGB digital video signal destined to be displayed on a display such as a liquid crystal display (LCD) is converted from the RGB color space to the YUV color space. The signal converted into the YUV color space is subjected to at least a processing operation selected among a sub-sampling operation (24) and a data compression operation (26). The signal is then stored in a memory and the signal read from said memory (12) is then subjected to at least a return operation (28, 30) complementary to the aforesaid processing operation (24, 26). The signal subjected to the aforesaid return operation is lastly reconverted from the YUV color space to the RGB color space, thus being susceptible to be displayed on the display.

27 Claims, 3 Drawing Sheets

METHOD AND DEVICE FOR PROCESSING VIDEO SIGNALS FOR PRESENTATION ON A DISPLAY AND CORRESPONDING COMPUTER PROGRAM PRODUCT

FIELD OF THE INVENTION

The present invention relates in general to liquid crystal displays, commonly denominated with the acronym LCD.

Especially in the color LCD version, the devices in question are applied in the most modern PDA (Personal Digital Assistant) devices and in third generation multimedia cell phones, with advanced video and graphics capabilities, whose use is destined to become ever more widespread over the next few years.

DESCRIPTION OF THE RELATED ART

Figure 1:
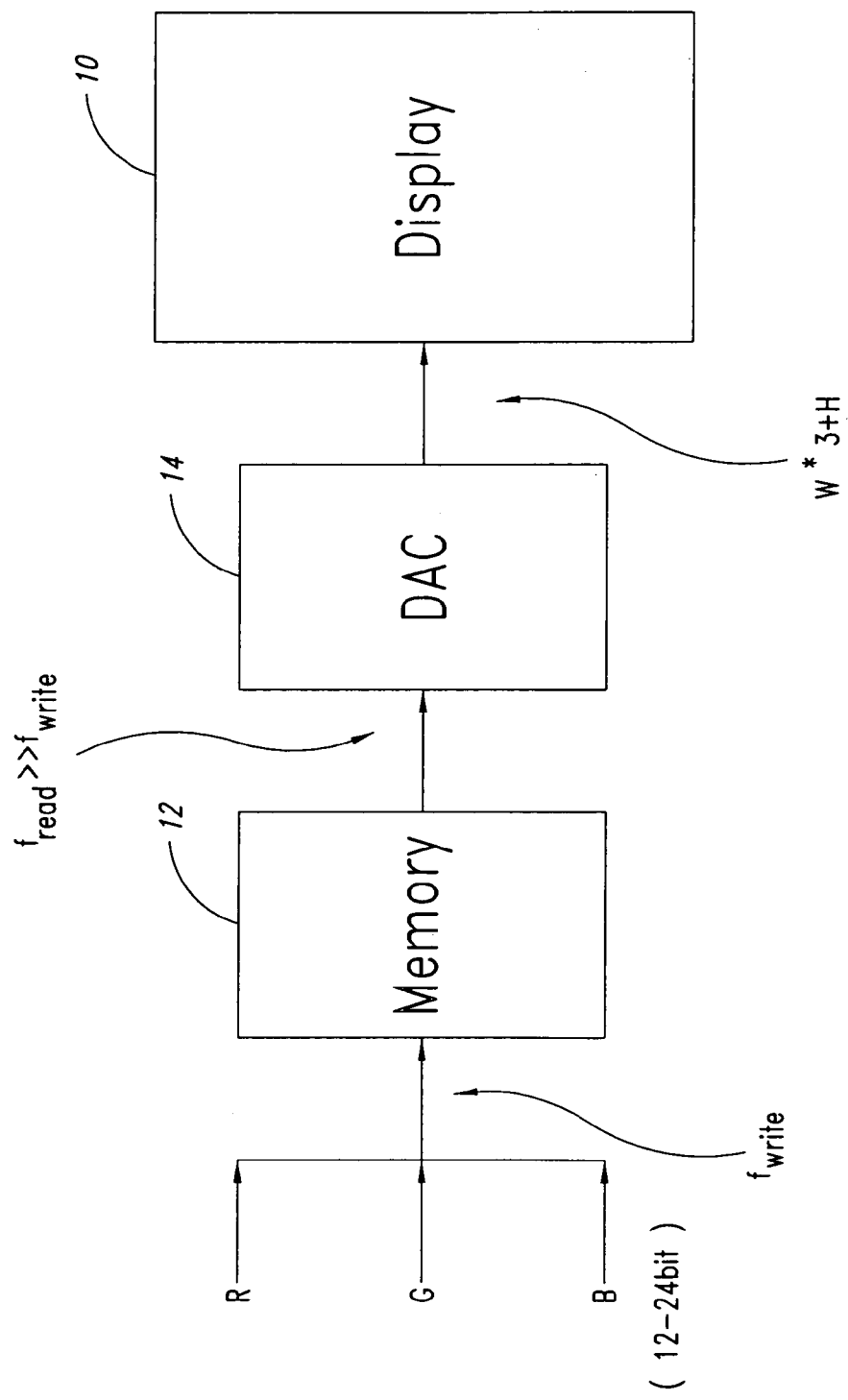

FIG. 1 in the accompanying drawings shows—in general terms—the architecture currently used for driving an LCD display, designated with the reference number 10.

In the diagram of FIG. 1, the display 10, having characteristics which can be considered wholly known insofar as the present context is concerned, carries associated therewith a memory 12 destined to contain the information about the image to be shown on the display 10. The memory 12, also known as picture memory, is read periodically and the information contained therein is transferred to the display 10, which displays them. To display an image on the display 10, therefore, it is necessary to record it on the memory 12, wherefrom it will be read and transferred to the display.

The memory 12 becomes necessary because, due to the physical properties of the fluid composing the liquid crystal cell, the content of each individual cell of the display 10 must periodically be overwritten with high frequency. The image to be display is then written in the memory 12 with a certain frequency $f_{write}$ and thence read and transferred to the display 10 with a frequency $f_{read}$ that is much greater than $f_{write}$, with $f_{read}$ being the so-called display refresh frequency. Typically, $f_{read}$ has a value that is 5 to 10 times greater than $f_{write}$. For instance, $f_{read}$ can be 70 Hz, whilst $f_{write}$ can be 15 Hz, if an MPEG-4 video stream is to be display.

The image is, in fact, a rectangular matrix of N samples called pixels (picture elements), each of which is expressed by means of three chromatic components, in other words through the intensity of the red component (R stands for "red"), of the green component (G stands for "green") and of the blue component (B stands for "blue"). In this way, the resulting color "c" of the pixel is ideally given by the relationship:

$$c=R+G+B$$

In a digital application, each of the three components is quantified on a certain number of levels and generally expressed with a precision of eight bit or less.

For a general overview of the RGB format in the application scope considered herein, reference can usefully be made to the work by J. L. Mitchell, W. B. Pennebaker, C. E. Fogg and D. J. LeGall, "Mpeg video compression standard", Chapman & Hall, 1997.

If each of the three components is expressed with eight bit precision, graphics are known as "true color", and each pixel thus occupies a memory space of 24 bits. In this case, possible color combinations are $2^{24}$, i.e. more than 16 million.

In so-called "high color" graphics, available pixels are reduced to 16 and distributed as follows: 5-pixel precision for red, 6-pixel for green and 5-pixel for blue for a total of $2^{16}$ possible combinations, equal to 65,536.

Hence, in the case of a "true color" system, the memory required to contain an image with a width of W pixels and a height of H pixels is equal to W.H.24 bit=3.W.H bytes. Considering as typical a display of QCIF dimensions, so that W=176 and H=144, the memory required therefore is equal to 76,032 bytes; in the case of high color graphics, instead, it is equal to 176.144.2=50,688 bytes.

To complete the description of FIG. 1, the reference 14 indicates a digital/analog converter, of a type globally known: for instance, it can be a PWM DAC converter destined to convert the digital signals read from the memory 12 into electrical signals allowing the actual presentation of the pixels on the display 10.

Structure and characteristics of the converter 14 must be considered globally known and, in any case, not relevant in themselves for purposes of understanding the present invention.

The assembly comprised of the memory 12 and the converter 14 is usually referred to as a "driver" associated with the display (LCD driver).

Figure 2:
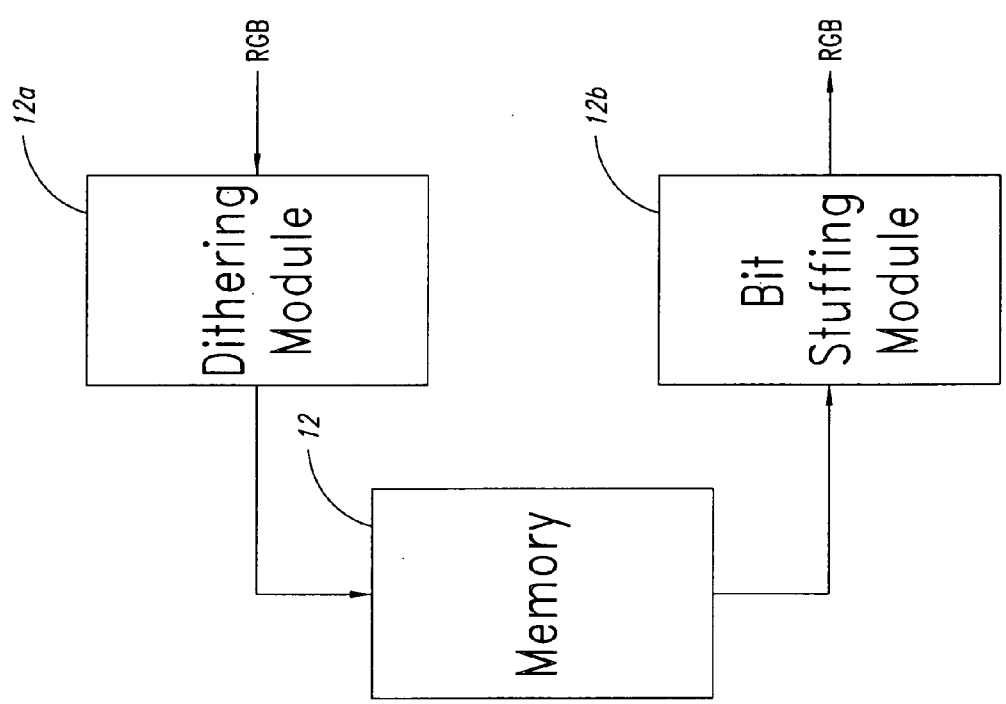

The diagram of FIG. 2 refers to a known structure of LCD driver, corresponding in particular to the device HD66766 manufactured by the company Hitachi (see in this regard the related data sheet, Rev 001, August 2001).

The solution shown in FIG. 2 allows to drive a display (not shown in FIG. 2) operating in "high color" mode.

For this purpose the incoming RGB signal is subjected, in a module designated as 12a, to a so-called dithering operation which aims to reduce the number of colors of the incoming image to the required precision. The RGB signal subjected to dithering is stored in the memory 12 to whose output is associated a module 12b.

Here, before they are transferred to the display, the signals read from the memory 12 are subjected to a "bit stuffing" operation aimed at restoring the bits lost during the dithering phase by attributing a value 0 to them.

OBJECT AND SUMMARY OF THE INVENTION

Although the aforementioned solutions according to the prior art are undoubtedly functional, the need remains to achieve additional improvements regarding the reduction of the memory of the driver associated to the LCD especially in view of a consequent reduction in occupied silicon area, of dissipated power and of the cost of the device.

An object of the present invention is to provide an enhanced solution in this respect.

According to the present invention, this aim is achieved thanks to a method having the characteristics specifically set out in the accompanying claims. The invention pertains to the corresponding device, as well as to the corresponding computer program product loadable into the memory of a computer and including software code portions for implementing the method according to the invention when the product is run on a digital processor.

BRIEF DESCRIPTION OF THE ACCOMPANYING DRAWINGS

The invention shall now be described, purely by way of non limiting example, with reference to the accompanying drawings, in which:

FIGS. 1 and 2, the latter one specifically representative of a prior art solution, have already been described above, FIG. 3 represents, in the form of a function block diagram, a possible embodiment of the solution according to the invention

DETAILED DESCRIPTION OF AN EMBODIMENT OF THE INVENTION

Figure 3:
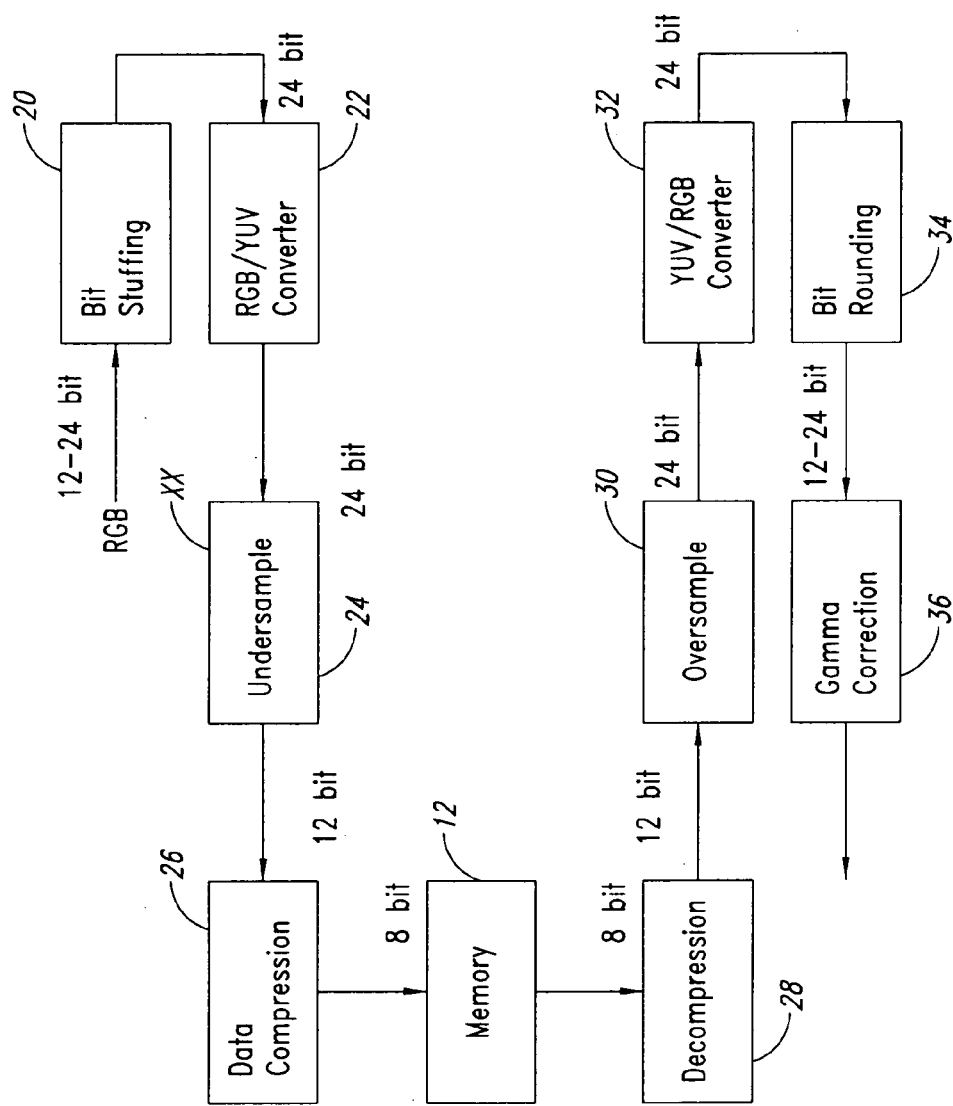

The function block diagram of FIG. 3 should be read in co-ordination with the diagrams of FIGS. 1 and 2.

The blocks 20 through 26 of the diagram of FIG. 3 refer to treatment operations/modules which intervene on the incoming RGB signal in view of its storage in the memory 12. The blocks designated with the references 28 through 36 instead indicate operations/modules intervening on the signal read from the memory 12 in view of its transfer to the display 10 (typically via the converter 14).

Next to the various blocks of FIG. 3 are indicated the lengths of the strings of bits present respectively at the input and at the output of each block.

It is thus readily apparent that the incoming RGB signal, arranged on 12 or 24 bits, is reduced to an 8-bit format in view of its storage in the memory 12. Starting from the signal read from the memory 12 (arranged on 8 bits), an output RGB signal on 12–24 bit is then (re)generated.

As stated, the object of the invention is to minimize the silicon area required by the picture memory 12, whilst maintaining a high video quality of the image, as well as limited electrical power consumption.

Preferably, the first operation performed on the incoming RGB signal is a bit stuffing operation (module 20), serving the purpose of bringing sample precision to the required value. The next part of the processing chain is conceived to work on true color graphics, with 8-bit precision for each chromatic component. This allows the driver to drive any kind of display, regardless of the number of colors it supports.

If the incoming image then has a precision that is lower than 24 bits per pixel (for example, 12 bits per pixel), the precision is increased to 24. This is done by setting to zero the most significant bits (MSB) or the least significant bits (LSB) for each chromatic component. For instance, if the incoming R, G or B components consist of 4, 5, 6 bits, respectively 4, 3, 2 null bits are inserted in MSB (or LSB) position depending on the selected solution.

The next module in the system, designated with the reference number 22, operates a conversion of the chromatic space of the pixels from the traditional RGB space (in the red, green and blue components) to the YUV space (of the luminance and chrominance components).

For a general illustration of the characteristics of the YUV chromatic space, reference can usefully be made to the previously mentioned work by J. L. Mitchell et al.

The operation can be simply expressed by means of a matrix relationship of the following kind:

$$\begin{bmatrix} Y \\ U \\ V \end{bmatrix} \equiv \begin{bmatrix} yr & yg & yb \\ ur & ug & ub \\ vr & vg & vb \end{bmatrix} \times \begin{bmatrix} R \\ G \\ B \end{bmatrix}$$

The elements of the conversion matrix of the color space can be expressed as short sums of powers of two, reducing the chromatic conversion to simple elementary shifting and summing operations, achievable at the hardware level with extreme efficiency.

This operation does not change the precision of the pixels, which remains 24 bits in total.

The conversion from the color space RGB to the color space YUV takes into account the physical characteristics of the human eye, which is very sensitive to the luminance component (Y), but not very sensitive to the chrominance components (U and V). This allows to filter chrominance, reducing the number of samples and thus effecting a first reduction of the memory taken up by the image.

Considering the image to be displayed as composed by three matrices Y, U, and V each of which has a dimension W.H, it is possible to proceed with a sub-sampling, and in particular with a horizontal sub-sampling which operates on the U and V matrices, reducing their dimensions to W/2.H, leaving the Y matrix unchanged. The overall effect is a minimal deterioration in image quality, certainly not perceptible to the human eye. In fact, the filtering can be expressed as:

$$y(n) = \sum_n a(n) \cdot x(n)$$

where the summation extends for n ranging from $-N/2$ to $N/2$.

Specifically, y(n) represents the filtered pixel, whilst x(n) is the source pixel. N is the number of adjacent samples necessary to perform the filtering, whilst a(n) designates the numerical coefficients of the filter. Taking into account the characteristics of the application, the complexity of the block can be minimized, setting N=2 and causing the coefficients to be reducible to a short sum of powers of two.

The data deriving from the sub-sampling operation performed in the module 24 are subjected, in the module designated as 26, to a data compression operation. This is in preferred fashion a data compression operation carried out operating differently on the luminance and chrominance components.

In particularly preferred fashion, the adopted solution is the one employed in the Rempeg 50 encoding/decoding device, manufactured by the same Applicant (in this regard, one can usefully consult the document R. Burger, D. Pau, "Rempeg 50 encoder/decoder. User manual", March 1999).

When it operates on luminance, the compression function receives at its input 16 bytes, corresponding to 16 samples and returns 9 at its output, thereby obtaining a constant compression factor of 9/16. When it operates on the chrominance, the algorithm receives at its input 8 bytes, corresponding to 8 samples and returns 4 at its output, thereby obtaining a constant compression factor of 1/2.

In strict terms, the compression solution described herein is of the "lossy" type, i.e. with information losses. The tests conducted by the Applicant, however, demonstrate that, in most envisioned applications, image quality deterioration is in fact negligible, hence not perceptible to the human eye.

It will be further appreciated that, though the execution of both is preferred, the solution according to the invention does not necessarily require the signal converted into the YUV format to be subjected both to sub-sampling and to compression.

Thanks to the transformation operations conducted in the modules 20 through 26 described above, the quantity of memory 12 that needs to be included in the LCD driver is very small.

In particular, the occupation of the entire image can be reduced to about 35%, thus saving as much as 65% of memory. All with negligible deterioration in quality both due to the perception characteristics of the human eye, and to the physical response characteristics of the liquid crystal display.

Therefore, a true color image can be stored in a space of 26,928 bytes, as opposed to the 76,032 bytes required by the other known solutions.

In regard to the treatment operations performed on the signal extracted from the memory 12, the modules designated as 28, 30 and 32 perform functions that are essentially complementary to the functions performed, respectively and in order, by the modules designated as 26, 24 and 22.

Thus the module 28 essentially performs a decompression that is complementary to the compression function performed in the module 26.

If, for example, for the module 26 the aforementioned Rempeg solution was adopted, the module 28 uses the Rempeg decompression function. According to this solution, when it decodes luminance, the module 28 receives 9 bytes at its input and returns 16, corresponding 16 samples. When it decodes chrominance, the module 28 receives 4 bytes at its input and returns 8, corresponding to 7 samples.

The module 30 instead is a horizontal super-sampling module which, by an inverse filtering operation on the chrominance components, converts the 4:2:2 format to the 4:4:4 format, returning the U and V matrices to the dimension W.H.

The modules 28 and 30 thus perform a returning operation, complementary to the operation or operations carried out by the modules 24 and 26.

Lastly, the module 32 inverts the matrix operation of color space transformation performed by the module 22, returning the signal fed at its input from the color space YUV to the initial color space RGB, with a precision of 8 bits for each of the 3 chromatic components.

The presence, in the diagram of FIG. 3, of the modules 34 and 36 is aimed at taking into account the fact that the display is driven by means of analog signals, so that the RGB values of the pixels must be made to pass through a digital/analog converter (DAC), such as the converter 14 of FIG. 1, whose precision is less than or equal to 8 bits. If it is less than 8, it is necessary to reduce the precision of the RGB samples from 8 bits to the required value through a bit manipulation operation.

For example, the following techniques can be used:
truncating the least significant bits,
approximation of the least significant bits to the closest integer, and
sum of pseudo-random noise followed by truncation.

These solution are substantially equivalent to each other, so the choice of one or the other is dictated by specific construction requirements.

In the case of 12, 16 and 18 bit inputs, the inverse bit stuffing function is implemented (in the module designated as 32). This operation can indifferently be operated eliminating the most significant bits (MSB) or the least significant bits (LSB) for each chromatic component, inserted as described above with reference to the module 20. For example, if for each R, G or B component the input consists of 4, 5 6 bits, then—respectively—4, 3 or 2 bits are removed in MSB (or LSB) position, depending on the selected solution.

The module 36, lastly, is destined to perform a range correction operation, aimed at correcting the intrinsic non-linearities of the display response by means of an appropriate re-mapping of the colors.

This function is performed (according to criteria known in themselves) by means of a look-up table (LUT).

Naturally, without altering the principle of the invention, the construction details and the embodiments may vary widely from what is described and illustrated herein, without thereby departing from the scope of the present invention.

In particular, it will be appreciated that the solution according to the invention is susceptible to be embodied advantageously by means of a dedicated processor. Alternatively, the solution according to the invention is susceptible to be embodied using a general purpose processor, appropriately programmed by means of a computer program product loadable into the memory of such a digital processor and including software code portions for implementing the method according to the invention when the computer program product is run on a digital processor.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. Method for processing an RGB digital video signal to be displayed on a display with the use of a memory, the method comprising the operations of:
converting said digital video signal from an RGB color space to a YUV color space to obtain a YUV video signal;
subjecting the YUV video signal to a processing operation selected from among a sub-sampling operation and a data compression operation to obtain a processed video signal;
storing in said memory said processed video signal;
reading from said memory the signal stored therein;
subjecting the processed video signal read from said memory to a return operation that is complementary to said processing operation, thereby obtaining a re-processed video signal; and
reconverting the re-processed video signal from the YUV color space to the RGB color space, to obtain a reconverted RGB digital video signal, wherein at least one among said converting and reconverting operations is performed as a matrix conversion using coefficients expressible as sums of powers of 2, so that said at least one among said converting and reconverting operations is performed using a series of elementary shifting and summing operations.

2. Method as claimed in claim 1, wherein said display is a liquid crystal display.

3. Method as claimed in claim 1 wherein the operation of subjecting the YUV video signal to the processing operation includes both of said operations of sub-sampling and data compression, and said return operation comprises both a data decompression operation and a super-sampling operation.

4. Method as claimed in claim 1 wherein said sub-sampling operation operates on chrominance matrices of said YUV video signal leaving unchanged a luminance matrix of said YUV video signal.

5. Method as claimed in claim 1 wherein said sub-sampling operation is a horizontal sub-sampling operation.

6. Method as claimed in claim 1 wherein said data compression operation operates in differentiated fashion on components of luminance and chrominance of said YUV video signal.

7. Method as claimed in claim 1, further comprising a bit stuffing operation performed on said RGB digital video signal before conversion into said YUV color space.

8. Method as claimed in claim 7, further comprising a bit rounding operation performed on said reconverted RGB signal before displaying said reconverted RGB signal on said display.

9. Method as claimed in claim 1, further comprising:
displaying said reconverted RGB signal on said display; and
a range correction operation by re-mapping said reconverted RGB signal in view of its display on said display.

10. Device for processing an RGB digital video signal for its display on a display, the device comprising:
a conversion module for converting said digital video signal from an RGB color space to a YUV color space to obtain a YUV video signal;
a processing module for subjecting the YUV video signal to a processing operation selected among a sub-sampling operation and a data compression operation, thereby obtaining a processed video signal;
a memory for storing said processed video signal;
a return module for receiving the processed video signal stored in said memory and subjecting the processed video signal received from said memory to a return operation, complementary to said processing operation, thereby obtaining a reprocessed video signal; and
a re-conversion module for re-converting the reprocessed video signal from the YUV color space to the RGB color space, to obtain a reconverted RGB digital video signals, wherein at least one of said conversion module and said re-conversion module is configured to carry out a matrix conversion using coefficients expressible as sums of powers of 2, so at least one among said converting and re-converting is performed by using a series of elementary shifting and summing operations.

11. Device as claimed in claim 10, wherein the device includes the display and the display is a liquid crystal display.

12. Device as claimed in claim 10 wherein the processing module includes both a sub-sampling module and a data compression module, and the return module includes both a data decompression module and a super-sampling module.

13. Device as claimed in claim 10 wherein said processing module is configured to carry out said sub-sampling operation by operating on chrominance matrices of said YUV video signal, leaving unaltered a luminance matrix of said YUV video signal.

14. Device as claimed in claim 10 wherein said processing module is configured to carry out said sub-sampling operation as a horizontal sub-sampling operation.

15. Device as claimed in claim 10 wherein said processing module is configured to carry out said data compression operation operating in differentiated fashion on a luminance component and on a chrominance component of said YUV video signal.

16. Device as claimed in claim 10, further comprising a bit stuffing module capable of operating on said RGB digital video signal before its conversion into YUV color space.

17. Device as claimed in claim 16, further comprising a bit rounding module capable of operating on said reconverted RGB signal before it is displayed on said display.

18. Device as claimed in claim 10, further comprising a range correction module for carrying out a re-mapping of said reconverted RGB signal in view of its display on said display.

19. Computer program product loadable into a memory of a digital processor and including software code portions for implementing, when said computer product is run on a digital processor, a method for processing an RGB digital video signal to be displayed on a display, the method comprising:
converting said digital video signal from an RGB color space to a YUV color space to obtain a YUV video signal;
subjecting the YUV video signal to a processing operation selected from among a sub-sampling operation and a data compression operation to obtain a processed video signal;
storing in said memory said processed video signal;
reading from said memory the processed video signal stored therein;
subjecting the processed video signal read from said memory to a return operation that is complementary to said processing operation, thereby obtaining a re-processed video signal; and
reconverting the re-processed video signal from the YUV color space to the RGB color space, to obtain a reconverted RGB digital video signal, wherein at least one among said converting and reconverting operations is performed as a matrix conversion using coefficients expressible as sums of powers of 2, so that said at least one among said converting and reconverting operations is performed using a series of elementary shifting and summing operations.

20. The computer program product of claim 19 wherein the operation of subjecting the YUV video signal to the processing operation includes both of said operations of sub-sampling and data compression, and said return operation comprises both a data decompression operation and a super-sampling operation.

21. The computer program product of claim 19 wherein said sub-sampling operation operates on chrominance matrices of said YUV video signal leaving unchanged a luminance matrix of said YUV video signal.

22. The computer program product of claim 19 wherein said sub-sampling operation is a horizontal sub-sampling operation.

23. The computer program product of claim 19 wherein said data compression operation operates in differentiated fashion on components of luminance and chrominance of said YUV video signal.

24. The computer program product of claim 19, further comprising a bit stuffing operation performed on said RGB digital video signal before conversion into said YUV color space.

25. The computer program product of claim 24, further comprising a bit rounding operation performed on said reconverted RGB signal before displaying said reconverted RGB signal on said display.

26. The computer program product of claim 19, wherein said display is a liquid crystal display.

27. The computer program product of claim 19, further comprising:
displaying said reconverted RGB signal on said display; and
a range correction operation by re-mapping said reconverted RGB signal in view of its display on said display.

* * * * *

UNITED STATES PATENT AND TRADEMARK OFFICE
CERTIFICATE OF CORRECTION

PATENT NO. : 7,012,618 B2
APPLICATION NO. : 10/610341
DATED : March 14, 2006
INVENTOR(S) : Pau et al.

It is certified that error appears in the above-identified patent and that said Letters Patent is hereby corrected as shown below:

Column 7
Line 35, "signals" should read as --signal--.

Signed and Sealed this

Twelfth Day of June, 2007

JON W. DUDAS
*Director of the United States Patent and Trademark Office*